US008192649B2

(12) United States Patent
Yeager et al.

(10) Patent No.: US 8,192,649 B2
(45) Date of Patent: Jun. 5, 2012

(54) CAPPED POLY(ARYLENE ETHER) COMPOSITION AND METHOD

(75) Inventors: Gary William Yeager, Rexford, NY (US); Hua Guo, Selkirk, NY (US); Zhiqing Lin, Loudonville, NY (US); Shahid Murtuza, Cohoes, NY (US)

(73) Assignee: Sabic Innovative Plastics IP B.V. (NL)

( * ) Notice: Subject to any disclaimer, the term of this patent is extended or adjusted under 35 U.S.C. 154(b) by 1211 days.

(21) Appl. No.: 11/737,990

(22) Filed: Apr. 20, 2007

(65) Prior Publication Data

US 2007/0191577 A1 Aug. 16, 2007

Related U.S. Application Data

(60) Division of application No. 10/604,214, filed on Jul. 1, 2003, now Pat. No. 7,235,192, which is a continuation-in-part of application No. 09/683,214, filed on Dec. 3, 2001, now Pat. No. 6,905,637, and a continuation-in-part of application No. 09/682,057, filed on Jul. 16, 2001, now Pat. No. 6,627,704, which is a continuation-in-part of application No. 09/452,733, filed on Dec. 1, 1999, now Pat. No. 6,352,782.

(60) Provisional application No. 60/262,522, filed on Jan. 18, 2001, provisional application No. 60/306,017, filed on Jul. 17, 2001, provisional application No. 60/262,571, filed on Jan. 18, 2001.

(51) Int. Cl.
C08F 287/00 (2006.01)
C09D 171/12 (2006.01)

(52) U.S. Cl. ........ 252/511; 252/500; 528/176; 528/192; 528/205; 525/132; 525/391

(58) Field of Classification Search ............... 252/500, 252/511; 525/27, 36, 390–397, 132; 528/125, 528/215, 176, 192, 205; 264/478, 464
See application file for complete search history.

(56) References Cited

U.S. PATENT DOCUMENTS

| | | |
|---|---|---|
| 3,219,625 A | 11/1965 | Blanchard et al. |
| 3,268,561 A | 8/1966 | Peppel et al. |
| 3,280,089 A | 10/1966 | Wright |
| 3,281,383 A | 10/1966 | Zelinski et al. |
| 3,285,895 A | 11/1966 | MacKenzie et al. |
| 3,306,874 A | 2/1967 | Hay |
| 3,356,761 A | 12/1967 | Fox |
| 3,375,228 A | 3/1968 | Holoch et al. |
| 3,476,722 A | 11/1969 | Schlatzer |
| 3,496,236 A | 2/1970 | Cooper et al. |
| 3,557,045 A | 1/1971 | Wright et al. |
| 3,575,923 A | 4/1971 | Jones |
| 3,595,942 A | 7/1971 | Wald et al. |
| 3,597,216 A | 8/1971 | Berardinelli et al. |
| 3,637,578 A | 1/1972 | Wright et al. |
| 3,808,286 A | 4/1974 | Olund |
| 3,883,612 A | 5/1975 | Pratt et al. |
| 3,936,414 A | 2/1976 | Wright et al. |
| 3,960,516 A | 6/1976 | Biardi |
| 3,996,195 A | 12/1976 | Sato et al. |
| 4,011,200 A | 3/1977 | Yonemitsu et al. |
| 4,028,341 A | 6/1977 | Hay |
| 4,038,343 A | 7/1977 | Yonemitsu et al. |
| 4,048,143 A | 9/1977 | Hay et al. |
| 4,054,425 A | 10/1977 | Sherman |
| 4,081,418 A | 3/1978 | Barua et al. |
| 4,088,729 A | 5/1978 | Sherman |
| 4,092,294 A | 5/1978 | Bennett, Jr. et al. |
| 4,131,729 A | 12/1978 | Schmitt et al. |
| 4,140,675 A | 2/1979 | White |
| 4,148,843 A | 4/1979 | Goossens |
| 4,158,736 A | 6/1979 | Lewis et al. |
| 4,165,422 A | 8/1979 | White et al. |
| 4,172,951 A | 10/1979 | Gruber et al. |
| 4,230,767 A | 10/1980 | Isaka et al. |
| 4,246,217 A | 1/1981 | Hottel, Jr. et al. |
| 4,257,936 A | 3/1981 | Matsumoto et al. |
| 3,306,875 A | 5/1981 | Hay |
| 4,298,718 A | 11/1981 | Mayr et al. |
| 4,327,013 A | 4/1982 | Peters |
| 4,337,349 A | 6/1982 | Orlowski et al. |
| 4,359,438 A | 11/1982 | Hoggins et al. |
| 4,440,923 A | 4/1984 | Bartmann et al. |
| RE31,883 E | 5/1985 | Bovenkerk et al. |
| 4,521,491 A | 6/1985 | Oizumi et al. |

(Continued)

FOREIGN PATENT DOCUMENTS

DE 31 17 514 A1 5/1981

(Continued)

OTHER PUBLICATIONS

Japanese Patent Application No. JP 04076018, Published Mar. 10, 1992, Human Translation, 28 pages.
Japanese Patent Application No. JP 06172470 A2, Published Jun. 21, 1994, Human Translation, 27 pages.
Japanese Patent Application No. JP 06184255 A2, Published Jul. 5, 1994, Human Translation, 25 pages.
Japanese Patent Application No. JP 0738128 A2, Published Sep. 12, 1995, Human Translation, 29 pages.
Japanese Patent Application No. JP 07238175 A2, Published Sep. 12, 1995, Human Translation, 24 pages.
Japanese Patent Application No. JP 07247414 A2, Published Sep. 26, 1995, Human Translation, 37 pages.
Japanese Patent Application No. JP 07247415 A2, Published Sep. 26, 1995, Human Translation, 28 pages.
Japanese Patent Application No. JP 07247416 A2, Published Sep. 26, 1995, Human Translation, 32 pages.

(Continued)

*Primary Examiner* — Stanley Silverman
*Assistant Examiner* — Kallambella Vijayakumar
(74) *Attorney, Agent, or Firm* — Cantor Colburn LLP

(57) ABSTRACT

A method of preparing a capped poly(arylene ether) resin includes reacting a capping agent with a blend of two or more poly(arylene ether) resins having different intrinsic viscosities. Cured compositions prepared from these capped poly (arylene ether) resins exhibit improved balances of stiffness, toughness, and dielectric properties compared to compositions with two or more separately capped and isolated poly (arylene ether) resins.

7 Claims, No Drawings

U.S. PATENT DOCUMENTS

| | | | |
|---|---|---|---|
| 4,521,584 A | 6/1985 | Heitz et al. | |
| 4,544,717 A | 10/1985 | Mayr et al. | |
| 4,562,243 A | 12/1985 | Percec | |
| 4,565,684 A | 1/1986 | Tibbetts et al. | |
| 4,572,813 A | 2/1986 | Arakawa | |
| 4,579,904 A | 4/1986 | Orlowski et al. | |
| 4,604,417 A | 8/1986 | Cottman | |
| 4,618,703 A | 10/1986 | Thanawalla et al. | |
| 4,634,742 A | 1/1987 | Percec | |
| 4,659,528 A | 4/1987 | Plowman et al. | |
| 4,663,230 A | 5/1987 | Tennent | |
| 4,663,402 A | 5/1987 | Percec et al. | |
| 4,664,971 A | 5/1987 | Soens | |
| 4,665,137 A | 5/1987 | Percec et al. | |
| 4,677,185 A | 6/1987 | Heitz et al. | |
| 4,701,514 A | 10/1987 | Percec | |
| 4,760,118 A | 7/1988 | White et al. | |
| H521 H | 9/1988 | Fan | |
| 4,794,096 A | 12/1988 | Ewen | |
| 4,806,601 A | 2/1989 | Percec | |
| 4,806,602 A | 2/1989 | White et al. | |
| 4,816,289 A | 3/1989 | Komatsu et al. | |
| 4,816,515 A | 3/1989 | Weiss | |
| 4,855,351 A | 8/1989 | Stein | |
| 4,871,816 A | 10/1989 | Percec et al. | |
| 4,874,826 A | 10/1989 | Sakamoto et al. | |
| 4,876,078 A | 10/1989 | Arakawa et al. | |
| 4,888,397 A | 12/1989 | van der Meer et al. | |
| 4,923,932 A | 5/1990 | Katayose et al. | |
| 4,923,942 A | 5/1990 | Takeyama et al. | |
| 4,975,403 A | 12/1990 | Ewen | |
| 5,021,523 A | 6/1991 | Iizuka | |
| 5,024,818 A | 6/1991 | Tibbetts et al. | |
| 5,039,781 A | 8/1991 | Neugebauer et al. | |
| 5,053,496 A | 10/1991 | Bertsch et al. | |
| 5,061,602 A | 10/1991 | Koch et al. | |
| 5,071,922 A | 12/1991 | Nelissen et al. | |
| 5,079,268 A | 1/1992 | Nelissen et al. | |
| 5,091,480 A | 2/1992 | Percec et al. | |
| 5,165,909 A | 11/1992 | Tennent et al. | |
| 5,171,761 A | 12/1992 | Penco et al. | |
| 5,189,116 A | 2/1993 | Boyd et al. | |
| 5,198,510 A | 3/1993 | Siebert et al. | |
| 5,200,122 A | 4/1993 | Katoh et al. | |
| 5,213,886 A | 5/1993 | Chao et al. | |
| 5,218,030 A | 6/1993 | Katayose et al. | |
| 5,219,951 A | 6/1993 | Nelissen et al. | |
| 5,240,973 A | 8/1993 | Katoh et al. | |
| 5,241,015 A | 8/1993 | Chou | |
| 5,243,002 A | 9/1993 | Razavi | |
| 5,258,455 A * | 11/1993 | Laughner et al. | 525/68 |
| 5,268,400 A | 12/1993 | Iseler et al. | |
| 5,304,600 A | 4/1994 | Nelissen et al. | |
| 5,306,318 A | 4/1994 | Carius et al. | |
| 5,308,811 A | 5/1994 | Suga et al. | |
| 5,310,820 A | 5/1994 | Nelissen et al. | |
| 5,314,512 A | 5/1994 | Sexton | |
| 5,332,801 A | 7/1994 | Tsukahara et al. | |
| 5,334,444 A * | 8/1994 | Bhoori et al. | 442/324 |
| 5,338,796 A | 8/1994 | Vianello et al. | |
| 5,352,745 A | 10/1994 | Katayose et al. | |
| 5,397,608 A | 3/1995 | Soens | |
| 5,405,896 A | 4/1995 | Fujiki et al. | |
| 5,407,972 A | 4/1995 | Smith et al. | |
| 5,444,134 A | 8/1995 | Matsumoto | |
| 5,584,893 A | 12/1996 | Mitchell | |
| 5,589,152 A | 12/1996 | Tennent et al. | |
| 5,591,382 A | 1/1997 | Nahass et al. | |
| 5,612,425 A | 3/1997 | Weber et al. | |
| 5,834,565 A | 11/1998 | Tracy et al. | |
| 5,851,382 A | 12/1998 | Sudhakar | |
| 5,851,646 A | 12/1998 | Takahashi et al. | |
| 5,880,221 A | 3/1999 | Liska et al. | |
| 5,885,149 A | 3/1999 | Gillet et al. | |
| 5,922,815 A | 7/1999 | Aycock et al. | |
| 5,965,663 A | 10/1999 | Hayase | |
| 6,022,550 A | 2/2000 | Watanabe | |
| 6,042,702 A | 3/2000 | Kolouch et al. | |
| 6,051,368 A | 4/2000 | Masuko et al. | |
| 6,090,872 A | 7/2000 | Albe et al. | |
| 6,103,413 A | 8/2000 | Hinton et al. | |
| 6,166,137 A * | 12/2000 | Brown et al. | 525/133 |
| 6,248,467 B1 | 6/2001 | Wilson et al. | |
| 6,251,308 B1 | 6/2001 | Butler | |
| 6,306,963 B1 | 10/2001 | Lane et al. | |
| 6,306,978 B1 * | 10/2001 | Braat et al. | 525/397 |
| 6,307,010 B1 | 10/2001 | Braat et al. | |
| 6,352,782 B2 | 3/2002 | Yeager et al. | |
| 6,365,069 B2 | 4/2002 | Butler et al. | |
| 6,384,176 B1 | 5/2002 | Braat et al. | |
| 6,436,315 B2 | 8/2002 | Butler | |
| 6,469,124 B2 | 10/2002 | Braat et al. | |
| 6,521,703 B2 | 2/2003 | Zarnoch et al. | |
| 6,569,982 B2 | 5/2003 | Hwang et al. | |
| 6,576,700 B2 | 6/2003 | Patel | |
| 6,593,391 B2 | 7/2003 | Teutsch et al. | |
| 6,617,398 B2 | 9/2003 | Yeager et al. | |
| 6,627,704 B2 | 9/2003 | Yeager et al. | |
| 6,627,708 B2 | 9/2003 | Braat et al. | |
| 6,627,798 B2 | 9/2003 | Falco et al. | |
| 6,780,959 B2 | 8/2004 | Braat et al. | |
| 6,794,481 B2 | 9/2004 | Amagai et al. | |
| 6,812,276 B2 | 11/2004 | Yeager | |
| 6,835,785 B2 | 12/2004 | Ishii et al. | |
| 6,841,629 B1 | 1/2005 | Maeda et al. | |
| 6,878,781 B2 | 4/2005 | Zarnoch et al. | |
| 6,878,782 B2 | 4/2005 | Merfeld et al. | |
| 6,878,783 B2 | 4/2005 | Yeager et al. | |
| 6,897,282 B2 | 5/2005 | Freshour et al. | |
| 6,905,637 B2 | 6/2005 | Yeager et al. | |
| 6,962,965 B2 | 11/2005 | Yeager et al. | |
| 7,067,595 B2 | 6/2006 | Zarnoch et al. | |
| 7,071,266 B2 | 7/2006 | Ishii et al. | |
| 7,119,136 B2 | 10/2006 | Campbell et al. | |
| 7,148,296 B2 | 12/2006 | Zarnoch et al. | |
| 7,235,192 B2 | 6/2007 | Yeager et al. | |
| 7,329,708 B2 | 2/2008 | Birsak et al. | |
| 2001/0049046 A1 | 12/2001 | Butler | |
| 2001/0053820 A1 | 12/2001 | Yeager et al. | |
| 2002/0005508 A1 | 1/2002 | Butler et al. | |
| 2002/0016420 A1 * | 2/2002 | Zarnoch et al. | 525/418 |
| 2002/0028337 A1 | 3/2002 | Yeater et al. | |
| 2002/0077447 A1 | 6/2002 | Hwang et al. | |
| 2002/0173597 A1 | 11/2002 | Zarnoch et al. | |
| 2003/0023006 A1 | 1/2003 | Patel | |
| 2003/0096123 A1 | 5/2003 | Yeager | |
| 2003/0194562 A1 | 10/2003 | Ishii et al. | |
| 2003/0215588 A1 | 11/2003 | Yeager et al. | |
| 2003/0220460 A1 | 11/2003 | Merfeld | |
| 2004/0018319 A1 | 1/2004 | Waldfried et al. | |
| 2004/0054121 A1 | 3/2004 | Peemans et al. | |
| 2004/0102583 A1 | 5/2004 | Freshour et al. | |
| 2004/0106750 A1 | 6/2004 | Yeager et al. | |
| 2004/0146692 A1 | 7/2004 | Inoue et al. | |
| 2004/0147715 A1 | 7/2004 | Ishii et al. | |
| 2004/0152848 A1 | 8/2004 | Ishii et al. | |
| 2004/0225082 A1 | 11/2004 | Maeda et al. | |
| 2004/0258852 A1 | 12/2004 | Ohno et al. | |
| 2004/0265595 A1 | 12/2004 | Tokiwa et al. | |
| 2005/0032979 A1 | 2/2005 | Yeager | |
| 2005/0065241 A1 | 3/2005 | Ishii et al. | |
| 2005/0070685 A1 | 3/2005 | Mitsui et al. | |
| 2005/0075462 A1 | 4/2005 | Zarnoch et al. | |
| 2005/0075463 A1 | 4/2005 | Zarnoch et al. | |
| 2005/0187373 A1 | 8/2005 | Yeager | |
| 2006/0160982 A1 | 7/2006 | Ishii et al. | |

FOREIGN PATENT DOCUMENTS

| | | |
|---|---|---|
| DE | 41 03 140 A1 | 2/1991 |
| EP | 0 135 124 A2 | 8/1984 |
| EP | 0 206 072 B2 | 6/1986 |
| EP | 0 261 574 B1 | 9/1987 |
| EP | 0 385 065 A1 | 1/1990 |
| EP | 0 498 088 A1 | 12/1991 |
| NL | 8902092 | 8/1989 |
| WO | WO 93/13251 | 7/1993 |
| WO | WO 99/19389 | 4/1999 |

| WO | WO 01/40354 A1 | 6/2001 |
| WO | WO 01/53413 | 7/2001 |
| WO | 2004078845 A1 | 9/2004 |

OTHER PUBLICATIONS

Japanese Patent Application No. JP 2004-231781 A2, Published Aug. 19, 2004, Human Translation, 19 pages.
H. Nava et al., "Functional Polymers and Sequential Copolymers by Phase Transfer Catalysis. 18. Synthesis and Characterization of α, w-bis((2,6-dimethylphenol)-poly(2,6-dimethyl-1,4-phenylene oxide) and α, w-bis(vinylbenzyl)-poly(2,6-dimethyl-14-phenylene oxide) Oligomers", Journal of Polymer Science: Part A: Polymer Chemistry, vol. 24, 965-990 (1986).
W. Heitz et al., "Synthesis of Telechelic Hard and Soft Segments", Polymer Preprints (American Chemical Society, Division of Polymer Chemistry) (1984), vol. 25, No. 1, pp. 136-137.
WO 03/076495; Sep. 18, 2003; Translation (29 pages).
Chemical Abstract 109:171608; JP63083152A2; Apr. 13, 1988 (2 pages).
Chemical Abstract 125:12414; JP08048841A2; Feb. 20, 1996 (4 pages).
Chemical Abstract 98:73296; JP57145148A2; Sep. 8, 1982 (2 pages).
Chemical Abstract 99:213561; JP58141240A2; Aug. 22, 1983 ( 2 pages).
Patent Abstracts of Japan; Publication No. 07-268205; Date of Publication of Application Oct. 17, 1995; (2 pages).
Patent Abstracts of Japan; Publication No. 08-012875; Date of Publication of Application Jan. 16, 1996; (1 page).
Patent Abstracts of Japan; Publication No. 11-080536; Date of Publication of Application Mar. 26, 1999; (2 pages).
Chemical Abstract 106:103480; JP61174208A2; Aug. 5, 1986 (1 page).
Chemical Abstract 107:97840; JP61287913A2; Dec. 18, 1986 ( 1 page).
Chan et al., Facile Quantitative Analysis of Hydroxyl End Groups of Poly(2,6-dimethyl-1,4-phenylene oxide)s by 31P NMR Spectroscopy, Macromolecutes, 27 (1994) pp. 6371-6375.
Li et al., "Shrinkage Control of Low-Profile Unsaturated Polyester Resins Cured at Low Temperature", Polymer, vol. 39, No. 23, 1998, pp. 5677-5687.
Derwent Abstract of DE 3117574 A1, 1981.
Derwent Abstract of NL 8902092, 1989.
Derwent Abstract of EP 498088 A1, 1991.
Derwent Abstract of JP 08/245872, 1996.
JP02199176 Publication Date Jul. 8, 1990. Abstract Only (1pg.).
Cohen, L.B. "Zircoaluminates Strengthen Premium Ranges of Chemical Coupling Agents"; Plastics Engineering; vol. 39; No. 11; Nov. 1983, pp. 29-32.
Coleen Pugh and V. Percec, "Group Transfer Polymerization of Some Unusual Acrylates and Methacrylates", Polym. Prepr. (Am. Chem. Soc., Div. Polym. Chem.), (1985), 26(2), 303-5.
European Search Report, Application No. 03254223.5-2102-, Date Sep. 16, 2003.
Gachter, et al.; Plastics Additives Handbook; "Stabilizers, Processing Aids, Plasticizers, Fillers, Reinforcements, Colorants for Thermoplastics"; $4^{th}$ Edition; Hanser Publishers; pp. 914-935, 1993.
Hermans, et al.; Macromolecules; Facile Quantitative Analysis of Hydroxyl end Groups of Poly (2,6-dimethyl-1, 4-phenylene oxide)s by 31P NMR Spectroscopy; vol. 27, No. 22; Oct. 24, 1994; pp. 6769-6375.
Monte, et al. "A New Generation of Age and Water Resistant Reinforced Plastics"; Annual Technical Conference; 1979; pp. 1-10.
Monte, et al. "Coupling Composites with Titante During Extrusion Processing"; Mooern Plastics; May 1984; pp. 74-78.
International Search Report Dated Jul. 15, 2003.
JP04088053; Mar. 19, 1992; Human Translation; 18 pages.
ASTM D6341-98 (Reapproved 2005) Standard Test Method for Determination of the Linear Coefficient of Thermal Expansion of Plastic Lumber and Plastic Lumber Shapes Between—30 and 140° F [-34.4 and 60° C]; 4 pages, 2006.
ASTM D6272-02; Standard Test Method for Flexural Properties of Unreinforced and Reinforced Plastics and Electrical Insulating Materials by Four-Point Bending; 9 pages, 2002.
ASTM D790-03; Standard Test Methods for Flexural Properties of Unreinforced and Reinforced Plastics and Electrical Insulating Materials; 11 pages, 2003.
ASTM D638-03; Standard Test Method for Tensile Properties of Plastics; 15 pages, 2004.
ASTM D256-06a; Standard Test Methods for Determining the Izod Pendulum Impact Resistance of Plastics; 20 pages, 2006.
Tsou et al., "Epoxidation of Poly-2-methyl-6-allyl-1,4-phenylene Oxide and Copolymer of 2-Methyl-6-allyl-4-bromo-phenol and 2,6-Dimethyl-4-bromophenol", Journal of Polymer Science: Part A, vol. 2, (1964), pp. 4425-4431.
Ishii et al., Sytheses and Properties of Allylated Poly(2,6-dimethyl-1,4-phenylene ether), ACS Symposium Series, vol. 614 (Microelectronics Technology), (1995), pp. 485-503.
Ishii et al., "Synthesis and Properties of Allylated Polyphenylene Ether", Polymeric Materials Science and Engineering, vol. 72, (1995), pp. 448-449.

* cited by examiner

CAPPED POLY(ARYLENE ETHER) COMPOSITION AND METHOD

CROSS REFERENCE TO RELATED APPLICATIONS

This application is division of U.S. application Ser. No. 10/604,214, filed Jul. 1, 2003 now U.S. Pat. No. 7,235,192, which is a continuation-in-part of U.S. application Ser. No. 09/683,214 filed Dec. 3, 2001 now U.S. Pat. No. 6,905,637, which in turn claims the benefit of U.S. Provisional Application Ser. Nos. 60/262,522 filed 18 Jan. 2001 and 60/306,017 filed 17 Jul. 2001; U.S. application Ser. No. 09/683,214 is also a continuation-in-part of U.S. application Ser. No. 09/682,057 filed Jul. 16, 2001 now U.S. Pat. No. 6,627,704, which is itself a continuation-in-part of U.S. application Ser. No. 09/452,733, filed Dec. 1, 1999 now U.S. Pat. No. 6,352,782, and further claims priority to U.S. Provisional Application Ser. No. 60/262,571, filed Jan. 18, 2001.

BACKGROUND

Thermoset compositions are employed in a wide variety of techniques for article fabrication, including, for example, resin transfer molding, sheet molding, bulk molding, pultrusion, injection molding (including reaction injection molding and atmospheric pressure molding), and the like. Thermoset compositions comprising poly(arylene ether) resins have been described. For example, U.S. Pat. No. 6,051,662 to Tracy et al. describes a curable composition comprising a thermosetting resin and a low molecular weight, unfunctionalized poly(arylene ether) resin. U.S. Pat. No. 6,521,703 to Zarnoch et al. describes a curable resin composition includes an unsaturated polyester, an alkenyl aromatic compound, and a capped poly(arylene ether). As another example, U.S. Pat. No. 6,352,782 to Yeager et al. describes a composition comprising a reactively endcapped poly(phenylene ether) resin and a curable unsaturated monomer composition.

There remains a need for curable compositions comprising improved balances of stiffness, toughness, and dielectric properties.

BRIEF SUMMARY

Improved balances of stiffness, toughness, and dielectric properties are obtained on curing a curable composition, comprising: a capped poly(arylene ether) resin prepared by capping a blend of a first poly(arylene ether) resin and a second poly(arylene ether) resin, wherein the first poly(arylene ether) resin and the second poly(arylene ether) resin have intrinsic viscosities differing by at least 0.1 deciliters per gram, measured at 25° C. in chloroform; an alkenyl aromatic monomer; and an acryloyl monomer.

Another embodiment is a method of preparing a capped poly(arylene ether) resin, comprising: reacting a capping agent with a blend of a first poly(arylene ether) resin and a second poly(arylene ether) resin, wherein the first poly(arylene ether) resin and the second poly(arylene ether) resin have intrinsic viscosities differing by at least 0.1 deciliters per gram, measured at 25° C. in chloroform.

Another embodiment is a cured composition, comprising the reaction product of: a capped poly(arylene ether) resin prepared by capping a blend of a first poly(arylene ether) resin and a second poly(arylene ether) resin, wherein the first poly(arylene ether) resin and the second poly(arylene ether) resin have intrinsic viscosities differing by at least 0.1 deciliters per gram, measured at 25° C. in chloroform; an alkenyl aromatic monomer; and an acryloyl monomer.

Other embodiments, including articles derived from the cured compositions, are described in detail below.

DETAILED DESCRIPTION OF THE PREFERRED EMBODIMENTS

One embodiment is a curable composition, comprising: a capped poly(arylene ether) resin prepared by capping a blend of a first poly(arylene ether) resin and a second poly(arylene ether) resin, wherein the first poly(arylene ether) resin and the second poly(arylene ether) resin have intrinsic viscosities differing by at least 0.1 deciliters per gram, measured at 25° C. in chloroform; an alkenyl aromatic monomer; and an acryloyl monomer.

As a result of extensive investigations of curable poly(arylene ether) resin-containing compositions and their preparation, the present inventors have discovered that improved property balances are obtained when the capped poly(arylene ether) resin employed in the curable composition is prepared by capping a mixture of two or more poly(arylene ether) resins having different intrinsic viscosities. This improved performance is particularly surprising given that similar advantages are not observed when a curable composition is prepared from two or more independently prepared and isolated capped poly(arylene ether) resins.

The curable composition comprises a capped poly(arylene ether) resin prepared by capping a blend of a first poly(arylene ether) resin and a second poly(arylene ether) resin, wherein the first poly(arylene ether) resin and the second poly(arylene ether) resin have intrinsic viscosities differing by at least 0.1 deciliters per gram, measured at 25° C. in chloroform. In one embodiment, the capped poly(arylene ether) resin has an intrinsic viscosity of about 0.15 to about 0.45 deciliters per gram. Within this range, the intrinsic viscosity of the capped poly(arylene ether) resin may preferably be at least about 0.20 deciliters per gram. Also within this range, the intrinsic viscosity of the capped poly(arylene ether) resin may preferably be up to about 0.40 deciliters per gram, more preferably up to about 0.35 deciliters per gram, even more preferably up to about 0.30 deciliters per gram, still more preferably up to about 0.25 deciliters per gram.

In one embodiment, the first poly(arylene ether) resin has an intrinsic viscosity of about 0.05 to less than 0.20 deciliters per gram. Within this range, it may be preferable to use a first poly(arylene ether) resin having an intrinsic viscosity of at least about 0.10 deciliters per gram. Also within this range it may be preferable to use a first poly(arylene ether) resin having an intrinsic viscosity of up to about 0.15 deciliters per gram. In another embodiment, the second poly(arylene ether) resin has an intrinsic viscosity of at least 0.20 to about 0.60 deciliters per gram. Within this range, it may be preferable to use a second poly(arylene ether) resin having an intrinsic viscosity of at least about 0.25 deciliters per gram. Also within this range it may be preferable to use a second poly(arylene ether) resin having an intrinsic viscosity of up to about 0.50 deciliters per gram, more preferably up to about 0.40 deciliters per gram, still more preferably up to about 0.35 deciliters per gram.

In one embodiment, the capped poly(arylene ether) resin has the structure $$Q(J-K)_y$$

wherein Q is the residuum of a monohydric, dihydric, or polyhydric phenol; y is 1 to 100; J comprises repeating structural units having the formula

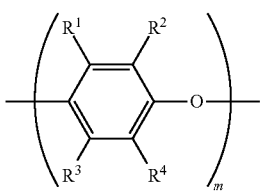

wherein $R^1$ and $R^3$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; $R^2$ and $R^4$ are each independently, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; m is 1 to about 200, preferably 1 to about 100, more preferably 1 to about 45; and K is a capping group selected from

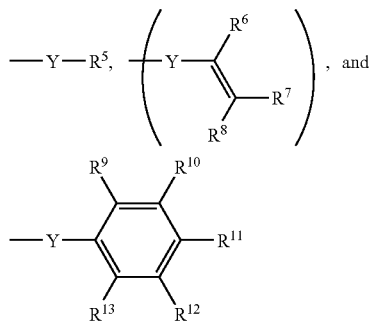

wherein $R^5$ is $C_1$-$C_{12}$ alkyl; $R^6$-$R^8$ are each independently hydrogen, $C_1$-$C_{18}$ hydrocarbyl, $C_2$-$C_{18}$ hydrocarbyloxycarbonyl, nitrile, formyl, carboxylate, imidate, thiocarboxylate, or the like; $R^9$-$R^{13}$ are each independently hydrogen, halogen, $C_1$-$C_{12}$ alkyl, hydroxy, amino, or the like; and wherein Y is a divalent group such as

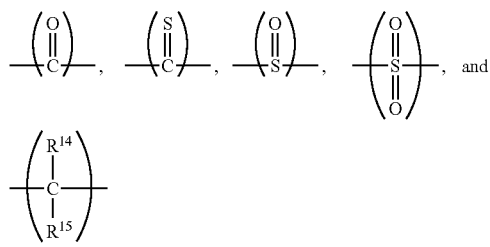

or the like, wherein $R^{14}$ and $R^{15}$ are each independently hydrogen, $C_1$-$C_{12}$ alkyl, or the like. As used herein, "hydrocarbyl" refers to a residue that contains only carbon and hydrogen. The residue may be aliphatic or aromatic, straight-chain, cyclic, branched, saturated or unsaturated. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue. Also, as used herein, the term "haloalkyl" includes alkyl groups substituted with one or more halogen atoms, including partially and fully halogenated alkyl groups. In one embodiment, Q is the residuum of a monohydric phenol.

In one embodiment, Q is the residuum of a phenol, including polyfunctional phenols, and includes radicals of the structure

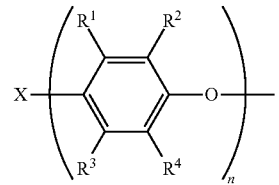

wherein $R^1$ and $R^3$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; $R^2$ and $R^4$ are each independently halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; X may be hydrogen, $C_1$-$C_{18}$ hydrocarbyl, or $C_1$-$C_{18}$ hydrocarbyl containing at least one substituent such as carboxylic acid, aldehyde, alcohol, amino radicals, or the like; X also may be sulfur, sulfonyl, sulfuryl, oxygen, or other such bridging group having a valence of 2 or greater to result in various bis- or higher polyphenols; y and n are each independently 1 to about 100, preferably 1 to 3, and more preferably about 1 to 2; in a preferred embodiment, y=n. Q may also be the residuum of a diphenol, such as 2,2',6,6'-tetramethyl-4,4'-diphenol.

In one embodiment, the capped poly(arylene ether) is produced by capping first and second poly(arylene ether) resins each consisting essentially of the polymerization product of at least one monohydric phenol having the structure

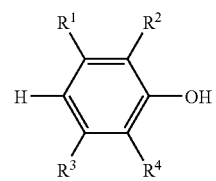

wherein $R^1$ and $R^3$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; $R^2$ and $R^4$ are each independently halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol. The poly(arylene ether) may be a copolymer of at least two monohydric phenols, such as 2,6-dimethylphenol and 2,3,6-trimethylphenol.

In one embodiment, the capped poly(arylene ether) comprises at least one capping group having the structure

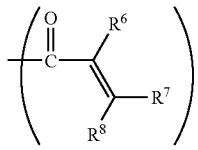

wherein $R^6$-$R^8$ are each independently selected from hydrogen, $C_1$-$C_{18}$ hydrocarbyl, $C_2$-$C_{12}$ hydrocarbyloxycarbonyl, nitrile, formyl, carboxylate, imidate, thiocarboxylate, and the like. In a preferred embodiment, $R^6$ is hydrogen or methyl, and $R^7$ and $R^8$ are hydrogen.

In another embodiment, the capped poly(arylene ether) comprises at least one capping group having the structure

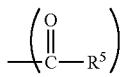

wherein $R^5$ is $C_1$-$C_{12}$ alkyl, preferably $C_1$-$C_6$ alkyl, more preferably methyl, ethyl, or isopropyl. The present inventors have surprisingly found that the advantageous properties of their invention can be achieved even when the capped poly (arylene ether) lacks a polymerizable function such as a carbon-carbon double bond.

In yet another embodiment, the capped poly(arylene ether) comprises at least one capping group having the structure

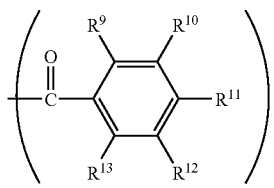

wherein $R^9$-$R^{13}$ are each independently hydrogen, halogen, $C_1$-$C_{12}$ alkyl, hydroxy, amino, or the like. Preferred capping groups of this type include salicylate ($R^9$=hydroxy, $R^{10}$-$R^{13}$=hydrogen).

In still another embodiment, the capped poly(arylene ether) comprises at least one capping group having the structure

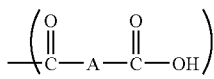

wherein A is a saturated or unsaturated $C_2$-$C_{12}$ divalent hydrocarbon group such as, for example, ethylene, 1,2-propylene, 1,3-propylene, 2-methyl-1,3-propylene, 2,2-dimethyl-1,3-propylene, 1,2-butylene, 1,3-butylene, 1,4-butylene, 2-methyl-1,4-butylene, 2,2-dimethyl-1,4-butylene, 2,3-dimethyl-1,4-butylene, vinylene (—CH=CH—), 1,2-phenylene, and the like. These capped poly(arylene ether) resins may conveniently be prepared, for example, by reaction of an uncapped poly(arylene ether) with a cyclic anhydride capping agent. Such cyclic anhydride capping agents include, for example, maleic anhydride, succinic anhydride, glutaric anhydride, adipic anhydride, phthalic anhydride, and the like.

The capped poly(arylene ether) is prepared by capping a blend of the first poly(arylene ether) resin and the second poly(arylene ether) resin. Capping comprises the reaction of an uncapped poly(arylene ether) with a capping agent. Capping agents include compounds known in the literature to react with phenolic groups. Such compounds include both monomers and polymers containing, for example, anhydride, acid chloride, epoxy, carbonate, ester, isocyanate, cyanate ester, or alkyl halide radicals. Capping agents are not limited to organic compounds as, for example, phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl)carbonate, acryloyl esters, methacryloyl esters, acetyl esters, phenylisocyanate, 3-isopropenyl-α,α-dimethylphenylisocyanate, cyanatobenzene, 2,2-bis(4-cyanatophenyl)propane), 3-(α-chloromethyl)styrene, 4-(α-chloromethyl)styrene, allyl bromide, and the like, carbonate and substituted derivatives thereof, and mixtures thereof. These and other methods of forming capped poly(arylene ether)s are described, for example, in U.S. Pat. No. 3,375,228 to Holoch et al.; U.S. Pat. No. 4,148,843 to Goossens; U.S. Pat. Nos. 4,562,243, 4,663, 402, 4,665,137, 4,701,514, 4,871,876, and 5,091,480 to Percec et al.; U.S. Pat. Nos. 5,071,922, 5,079,268, 5,304,600, and 5,310,820 to Nelissen et al.; U.S. Pat. No. 5,338,796 to Vianello et al.; U.S. Pat. No. 6,352,782 to Yeager et al.; U.S. Pat. No. 6,384,176 to Braat et al.; U.S. Patent Application Publication No. 2001/0053820 A1 of Yeager et al.; and European Patent No. 261,574 B1 to Peters et al.

In a preferred embodiment, the capped poly(arylene ether) may be prepared by reaction of the blend of the first poly (arylene ether) resin and the second poly(arylene ether) resin with an anhydride in an alkenyl aromatic monomer as solvent. This approach has the advantage of generating the capped poly(arylene ether) in a form that can be immediately blended with other components to form a curable composition. Using this method, no isolation of the capped poly(arylene ether) or removal of unwanted solvents or reagents is required.

A capping catalyst may be employed in the reaction of an uncapped poly(arylene ether) with an anhydride. Examples of such compounds include those known to the art that are capable of catalyzing condensation of phenols with the capping agents described above. Useful materials are basic compounds including, for example, basic compound hydroxide salts such as sodium hydroxide, potassium hydroxide, tetraalkylammonium hydroxides, and the like; tertiary alkylamines such as tributyl amine, triethylamine, dimethylbenzylamine, dimethylbutylamine and the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino) pyridine, 4-(1-pyrrolino)pyridine, 4-(1-piperidino)pyridine, 2-vinylpyridine, 3-vinylpyridine, 4-vinylpyridine, and the like. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The curable composition comprises about 1 to about 98 parts of the capped poly(arylene ether) per 100 parts total of the capped poly(arylene ether), the alkenyl aromatic monomer, and the acryloyl monomer. Within this range, the capped poly(arylene ether) resin amount is preferably at least about 10 parts by weight, more preferably at least about 15 parts by weight. Also within this range, the capped poly(arylene ether) resin amount is preferably up to about 70 parts by weight, more preferably up to about 50 parts by weight, still more preferably up to about 40 parts by weight.

In addition to the capped poly(arylene ether) resin, the curable composition comprises an alkenyl aromatic monomer. Suitable alkenyl aromatic monomers may have the structure

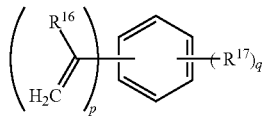

wherein each occurrence of $R^{16}$ is independently hydrogen or $C_1$-$C_{18}$ hydrocarbyl; each occurrence of $R^{17}$ is independently halogen, $C_1$-$C_{12}$ alkyl, $C_1$-$C_{12}$ alkoxyl, or $C_6$-$C_{18}$ aryl; p is 1 to 4; and q is 0 to 5. Alkenyl aromatic monomers include, for example, styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and the like, and combinations thereof. Particularly preferred alkenyl aromatic monomers include styrene and α-methylstyrene.

The composition comprises about 1 to about 98 parts by weight of the alkenyl aromatic monomer per 100 parts by weight total of the capped poly(arylene ether), the alkenyl aromatic monomer, and the acryloyl monomer. Within this range, the alkenyl aromatic monomer amount is preferably at least about 30 parts by weight, more preferably at least about 40 parts by weight, still more preferably at least about 50 parts by weight. Also within this range, the alkenyl aromatic monomer amount is preferably up to about 80 parts by weight, more preferably up to about 70 parts by weight.

In addition to the capped poly(arylene ether) resin and the alkenyl aromatic monomer, the composition comprises an acryloyl monomer. In one embodiment, the acryloyl monomer comprises at least one acryloyl moiety having the structure

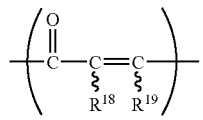

wherein $R^{18}$ and $R^{19}$ are each independently hydrogen, $C_1$-$C_{12}$ alkyl, or the like; and wherein $R^{18}$ and $R^{19}$ may be disposed either cis or trans about the carbon-carbon double bond. In one embodiment, the acryloyl monomer comprises at least two acryloyl moieties. In another embodiment, the acryloyl monomer comprises at least three acryloyl moieties.

In another embodiment, the acryloyl monomer comprises at least one acryloyl moiety having the structure

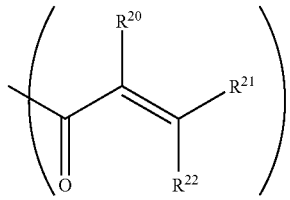

wherein $R^{20}$-$R^{22}$ are each independently hydrogen, $C_1$-$C_{12}$ hydrocarbyl, $C_2$-$C_{18}$ hydrocarbyloxycarbonyl, nitrile, formyl, carboxylate, imidate, thiocarboxylate, or the like. In one embodiment, the acryloyl monomer comprises at least two acryloyl moieties. In another embodiment, the acryloyl monomer comprises at least three acryloyl moieties.

In one embodiment, the acryloyl monomer comprises an acryloyl monomer having a number average molecular weight less than 1,000 AMU and an acryloyl monomer having a number average molecular weight greater than 2,500 g/mol.

Suitable acryloyl monomers include, for example, trimethylolpropane tri(meth)acrylate, 1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl(meth)acrylate, methyl(meth)acrylate, and the like, and mixtures thereof. It will be understood that the fragment "(meth)acrylate" signifies acrylate or methacrylate. Many other suitable acryloyl monomers are described in U.S. Patent Application Publication No. US 2001/0053820 A1 to Yeager et al.

The composition may comprise about 1 to about 98 parts by weight of the acryloyl monomer per 100 parts by weight total of the capped poly(arylene ether), the alkenyl aromatic monomer, and the acryloyl monomer. Within this range, the acryloyl monomer amount may preferably be at least about 5 parts by weight, more preferably at least about 15 parts by weight. Also within this range, the acryloyl monomer amount may preferably be up to about 70 parts by weight, preferably be up to about 50 parts by weight, more preferably up to about 30 parts by weight.

The curable composition may, optionally, further comprise a polymeric additive to reduce shrinkage and improve surface properties. The polymeric additive is generally characterized by a glass transition temperature less than or equal to 100° C., a Young's modulus less than or equal to 1000 megapascals at 25° C., and solubility in the combined functionalized poly (arylene ether), alkenyl aromatic monomer, and acryloyl monomer. Suitable polymeric additives include, for example, poly(styrene-methyl methacrylate) copolymers, polybutenes, poly(ethylene-butene) copolymers, polybutadienes, polybutadiene-block-polyisoprene copolymers, polybutadiene-graft-maleic anhydride copolymers, poly(vinyl ether)s, poly(alkyl(meth)acrylate)s, poly(vinyl alkanoate)s, polysiloxanes, and the like, and mixtures thereof. Preferred polymeric additives include polybutadienes, polybutadiene-block-polyisoprene copolymers, and polybutadiene-graft-maleic anhydride copolymers. Additional polymeric additives and methods for incorporating them into the composition are described in U.S. Patent Application Publication No. 2002/0169256 A1 to Merfeld et al. When present, the polymeric additive may be used at about 0.1 to about 30 parts by weight of the polymeric additive, based on 100 parts by weight total of the functionalized poly(arylene ether), the alkenyl aromatic monomer, and the acryloyl monomer.

The curable composition may, optionally, further comprise a curing catalyst to increase the curing rate of the unsaturated components. Curing catalysts, also referred to as initiators, are well known to the art and used to initiate the polymerization, cure or crosslink any of numerous thermoplastics and thermosets including unsaturated polyester, vinyl ester and allylic thermosets. Suitable curing catalysts are described, for example, in U.S. Patent Application Publication No. US 2001/0053820 A1 to Yeager et al., and references cited therein. The curing catalyst for the unsaturated portion of the thermoset may include any compound capable of producing radicals at elevated temperatures. Such curing catalysts may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures comprising at least one of the foregoing curing catalysts. Typical non-peroxy initiators include, for example, 2,3-dimethyl-2,3-diphenylbutane, 2,3-trimethylsilyloxy-2,3-diphenylbutane, and the like, and mixtures comprising at least one of the foregoing curing catalysts. The curing catalyst for the unsaturated portion of the thermoset may further include any compound capable of initiating anionic polymerization of the unsaturated components. Such anionic polymerization catalysts include, for example, alkali metal amides, such as sodium amide ($NaNH_2$) and lithium diethyl amide ($LiN(C_2H_5)_2$); alkali metal and ammonium salts of $C_1$-$C_{10}$ alkoxides; alkali metal and ammonium hydroxides; alkali metal cyanides; organometallic compounds such as the alkyl lithium compound n-butyl lithium and the Grignard reagent phenyl magnesium bromide; and the like; and combinations comprising at least one of the foregoing anionic polymerization catalysts.

In a preferred embodiment, the curing catalyst may comprise t-butylperoxybenzoate or methyl ethyl ketone peroxide. The curing catalyst may promote curing at a temperature of about 0° C. to about 200° C.

When present, the curing catalyst may be used in an amount of about 0.1 to about 10 parts by weight per 100 parts total of the capped poly(arylene ether), the alkenyl aromatic monomer, and the acryloyl monomer. Within this range, it may be preferred to use a curing catalyst amount of at least about 0.5 parts by weight, more preferably at least about 1 part by weight. Also within this range, it may be preferred to use a curing catalyst amount of up to about 5 parts by weight, more preferably up to about 3 parts by weight.

The curable composition may, optionally, further comprise a curing promoter to decrease the gel time. Suitable curing promoters include transition metal salts and complexes such as cobalt naphthanate; and organic bases such as N,N-dimethylaniline (DMA) and N,N-diethylaniline (DEA). Preferably, cobalt naphthanate and DMA are used in combination. When present, the promoter may be used in an amount of about 0.05 to about 3 parts, per 100 parts total of the poly(arylene ether) and the fused alicyclic (meth)acrylate monomer.

The composition may further comprise one or more fillers, including particulate fillers and fibrous fillers. Examples of such fillers well known to the art include those described in "Plastic Additives Handbook, 4$^{th}$ Edition" R. Gachter and H. Muller (eds.), P. P. Klemchuck (assoc. ed.) Hansen Publishers, New York 1993. A particulate filler is herein defined as a filler having an average aspect ratio less than about 5:1. Non-limiting examples of fillers include silica powder, such as fused silica and crystalline silica; boron-nitride powder and boron-silicate powders for obtaining cured products having low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (as its anhydride, dihydrate or trihydrate), calcium carbonate including chalk, limestone, marble and synthetic, precipitated calcium carbonates, generally in the form of a ground particulate which often comprises 98+% $CaCO_3$ with the remainder being other inorganics such as magnesium carbonate, iron oxide, and alumino-silicates; surface-treated calcium carbonates; talc, including fibrous, modular, needle shaped, and lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilanes or acryloylsilanes coatings to impart good physicals to compounded blends; feldspar and nepheline syenite; silicate spheres; flue dust; cenospheres; finite; aluminosilicate (atmospheres), including silanized and metallized aluminosilicate; natural silica sand; quartz; quartzite; perlite; Tripoli; diatomaceous earth; synthetic silica, including those with various silane coatings, and the like.

Preferred particulate fillers include calcium carbonates having an average particle size of about 1 to about 10 micrometers. Within this range, the average particle size may be at least about 2 micrometers, or at least about 3 micrometers. Also within this range, the average particle size may be up to about 8 micrometers, or up to about 7 micrometers. Preferred particulate fillers further include aluminum trihydrate (also known as aluminum trihydroxide, aluminum hydroxide, hydrated alumina, or ATH).

Fibrous fillers include short inorganic fibers, including processed mineral fibers such as those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, carbon, iron, nickel, copper. Also included among fibrous fillers are glass fibers, including textile glass fibers such as E, A, C, ECR, R, S, D, and NE glasses and quartz. Preferred fibrous fillers include glass fibers having a diameter of about 5 to about 25 micrometers and a length before compounding of about 0.5 to about 4 centimeters. Many other suitable fillers are described in U.S. Patent Application Publication No. 2001/0053820 A1 to Yeager et al. In one embodiment, the filler comprises glass fibers. In a another embodiment, the filler comprises both aluminum trihydrate and glass fibers.

The formulation may also contain adhesion promoters to improve adhesion of the thermosetting resin to the filler or to an external coating or substrate. Also possible is treatment of the aforementioned inorganic fillers with adhesion promoter to improve adhesion. Adhesion promoters include chromium complexes, silanes, titanates, zirco-aluminates, propylene maleic anhydride copolymers, reactive cellulose esters and the like. Chromium complexes include those sold by DuPont under the tradename VOLAN®. Silanes include molecules having the general structure $(RO)_{(4-n)}SiY_n$ wherein n=1-3, R is an alkyl or aryl group and Y is a reactive functional group which can enable formation of a bond with a polymer molecule. Particularly useful examples of coupling agents are those having the structure $(RO)_3SiY$. Typical examples include vinyl-triethoxysilane, vinyl tris(2-methoxy)silane, γ-methacryloxypropyltrimethoxy silane, γ-aminopropyltriethoxysilane, γ-glycidoxypropyltrimethoxysilane, and γ-mercaptopropyltrimethoxysilane. Titanates include those developed by S. J. Monte et al. in Ann. Chem. Tech Conf. SPI (1980), Ann. Tech Conf. Reinforced Plastics and Composite Inst. SPI 1979, Section 16E, New Orleans; and S. J. Monte, Mod. Plastics Int., volume 14, number 6 pg. 2 (1984). Zirco-aluminates include those described by L. B. Cohen in Plastics Engineering, volume 39, number 11, page 29 (1983). The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

When present, the particulate filler may be used in an amount of about 1 to about 80 weight percent, based on the total weight of the composition. Within this range, it may be preferred to us a particulate filler amount of at least about 10 weight percent, more preferably at least about 20 weight percent, yet more preferably at least about 30 weight percent, still more preferably at least about 40 weight percent. Also within this range, it may be preferred to use a particulate filler amount of up to about 75 weight percent, more preferably up to about 60 weight percent. The particulate filler amount may alternatively be expressed in parts by weight per 100 parts by weight total of the capped poly(arylene ether), the alkenyl aromatic monomer, and the acryloyl monomer. Thus the particulate filler amount may be about 1 to about 1000 parts by weight per 100 parts by weight total of the capped poly (arylene ether), the alkenyl aromatic monomer, and the acryloyl monomer. Within this range, the particular filler amount may preferably be at least about 5 parts by weight, more preferably at least about 10 parts by weight. Also within this range, the particulate filler amount may preferably be up to about 500 parts by weight, more preferably up to about 200 parts by weight.

When present, the fibrous filler may be used in an amount of about 2 to about 80 weight percent, based on the total weight of the composition. Within this range, it may be preferred to us a fibrous filler amount of at least about 5 weight percent, more preferably at least about 10 weight percent, yet more preferably at least about 15 weight percent. Also within this range, it may be preferred to use a fibrous filler amount of up to about 60 weight percent, more preferably up to about 40 weight percent, still more preferably up to about 35 weight percent. The fibrous filler amount may alternatively be expressed in parts by weight per 100 parts by weight total of the capped poly(arylene ether), the alkenyl aromatic monomer, and the acryloyl monomer. Thus the fibrous filler amount may be about 1 to about 1000 parts by weight per 100 parts by weight total of the capped poly(arylene ether), the alkenyl aromatic monomer, and the acryloyl monomer. Within this range, the particular filler amount may preferably be at least about 5 parts by weight, more preferably at least about 10 parts by weight. Also within this range, the fibrous filler amount may preferably be up to about 500 parts by weight, more preferably up to about 200 parts by weight.

The aforementioned fillers may be added to the thermosetting resin without any treatment, or after surface treatment, generally with an adhesion promoter.

The curable composition may, optionally, further comprise one or more additives known in the art, such as, for example, dyes, pigments, colorants, conductive agents, antioxidants, heat stabilizers, light stabilizers, plasticizers, lubricants, flow modifiers, flame retardants, drip retardants, antiblocking agents, antistatic agents, flow-promoting agents, processing aids, and the like, and combinations thereof. Those skilled in the art may select suitable additives and determine suitable amounts.

One embodiment is a curable composition, comprising: a (meth)acrylate-capped poly(arylene ether) resin prepared by capping a blend of a first poly(arylene ether) resin having an intrinsic viscosity of about 0.05 to about 0.20 deciliters per gram and a second poly(arylene ether) resin having an intrinsic viscosity of about 0.25 to about 0.40 deciliters per gram, with the proviso that the first poly(arylene ether) resin and the second poly(arylene ether) resin have intrinsic viscosities differing by at least 0.1 deciliters per gram; wherein all intrinsic viscosities are measured at 25° C. in chloroform; an alkenyl aromatic monomer selected from styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and combinations thereof.; and an acryloyl monomer selected from trimethylolpropane tri(meth)acrylate, 1,6-hexanediol di(meth)acrylate, neopenyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl(meth)acrylate, methyl (meth)acrylate, and mixtures thereof.

Another embodiment is a curable composition, comprising: about 1 to about 70 parts by weight of a (meth)acrylate-capped poly(2,6-dimethyl-1,4-phenylene ether) resin prepared by capping a blend of a first poly(2,6-dimethyl-1,4-phenylene ether) resin having an intrinsic viscosity of about 0.1 to about 0.2 deciliters per gram and a second poly(2,6-dimethyl-1,4-phenylene ether) resin having an intrinsic viscosity of about 0.25 to about 0.35 deciliters per gram, with the proviso that the first poly(2,6-dimethyl-1,4-phenylene ether) resin and the second poly(2,6-dimethyl-1,4-phenylene ether) resin have intrinsic viscosities differing by at least 0.1 deciliters per gram; wherein all intrinsic viscosities are measured at 25° C. in chloroform; about 30 to about 98 parts by weight of styrene; about 1 to about 69 parts by weight of an acryloyl monomer selected from trimethylolpropane tri(meth)acrylate, 1,6-hexanediol di(meth)acrylate, cyclohexanedimethanol di(meth)acrylate, neopenyl glycol di(meth)acrylate, and mixtures thereof; about 5 to about 500 parts by weight of aluminum trihydrate; and about 5 to about 500 parts by weight of glass fibers; wherein all parts by weight are based on 100 parts by weight total of the (meth)acrylate-capped poly(2,6-dimethyl-1,4-phenylene ether) resin, styrene, and the acryloyl monomer.

There is no particular limitation on the method by which the curable composition is prepared. The composition may be prepared by forming an intimate blend comprising the capped poly(arylene ether), the alkenyl aromatic monomer, and the acryloyl monomer. The composition may be prepared directly from a blend of the first and second poly(arylene ether) resins by dissolving the blend in a portion of the alkenyl aromatic monomer, adding a capping agent to form the capped poly(arylene ether) in the presence of the alkenyl aromatic monomer, and adding the acryloyl monomer and any other components to form the curable composition.

There is no particular limitation on the method by which the composition may be cured. The composition may, for example, be cured thermally or by using irradiation techniques, including UV irradiation and electron beam irradiation. When heat curing is used, the temperature selected may be about 80° to about 300° C. Within this range, a temperature of at least about 120° C. may be preferred. Also within this range, a temperature up to about 240° C. may be preferred. The heating period may be about 30 seconds to about 24 hours. Within this range, it may be preferred to use a heating time of at least about 1 minute, more preferably at least about 2 minutes. Also within this range, it may be preferred to use a heating time up to about 10 hours, more preferably about 5 hours, yet more preferably up to about 3 hours. Such curing may be staged to produce a partially cured and often tack-free resin, which then is fully cured by heating for longer periods or temperatures within the aforementioned ranges.

When the curable composition is a bulk molding composition, the following molding conditions represent a useful starting point for optimized molding: a mold temperature of about 300 to about 320° C.; a cure time of approximately 120 seconds per one-eighth inch of wall thickness; and a clamp pressure of about 500 to about 2000 pounds per square inch.

One embodiment is a cured composition obtained by curing any of the above-described curable compositions. Because the components of the curable composition may react with each other during curing, the cured compositions may be described as comprising the reaction product of the curable composition components. Thus, one embodiment is a cured composition, comprising the reaction product of a capped poly(arylene ether) resin prepared by capping a blend of a first poly(arylene ether) resin and a second poly(arylene ether) resin, wherein the first poly(arylene ether) resin and the second poly(arylene ether) resin have intrinsic viscosities differing by at least 0.1 deciliters per gram, measured at 25° C. in chloroform; an alkenyl aromatic monomer; and an acryloyl monomer. Another embodiment is a cured composition, comprising the reaction product of: a (meth)acrylate-capped poly(arylene ether) resin prepared by capping a blend of a first poly(arylene ether) resin having an intrinsic viscosity of about 0.05 to about 0.20 deciliters per gram and a second poly(arylene ether) resin having an intrinsic viscosity of about 0.25 to about 0.40 deciliters per gram, with the proviso that the first poly(arylene ether) resin and the second poly(arylene ether) resin have intrinsic viscosities differing by at least 0.1 deciliters per gram; wherein all intrinsic viscosities are measured at 25° C. in chloroform; an alkenyl aromatic monomer selected from styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and combinations thereof.; and an acryloyl monomer selected from trimethylolpropane tri(meth)acrylate, 1,6-hexanediol di(meth)acrylate, ethylene glycol di(meth)acrylate, neopenyl glycol di(meth)acrylate propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl (meth)acrylate, methyl (meth)acrylate, and mixtures thereof. Another embodiment is a cured composition, comprising the reaction product of: about 1 to about 70 parts by weight of a (meth)acrylate-capped poly(2,6-dimethyl-1,4-phenylene ether) resin prepared by capping a blend of a first poly(2,6-dimethyl-1,4-phenylene ether) resin having an intrinsic viscosity of about 0.1 to about 0.2 deciliters per gram and a second poly(2,6-dimethyl-1,4-phenylene ether) resin having an intrinsic viscosity of about 0.25 to about 0.35 deciliters per gram, with the proviso that the first poly(2,6-dimethyl-1,4-phenylene ether) resin and the second poly(2, 6-dimethyl-1,4-phenylene ether) resin have intrinsic viscosities differing by at least 0.1 deciliters per gram; wherein all intrinsic viscosities are measured at 25° C. in chloroform; about 30 to about 98 parts by weight of styrene; about 1 to about 69 parts by weight of an acryloyl monomer selected from trimethylolpropane tri(meth)acrylate, 1,6-hexanediol di(meth)acrylate, neopenyl glycol di(meth)acrylate, and mixtures thereof; about 5 to about 500 parts by weight of aluminum trihydrate; and about 5 to about 500 parts by weight of glass fibers; wherein all parts by weight are based on 100 parts by weight total of the (meth)acrylate-capped poly(2,6-dimethyl-1,4-phenylene ether) resin, styrene, and the acryloyl monomer. It will be understood that the terms "curing" and "cured" include partial curing to form, for example, so-called B-stage compositions.

Another embodiment is an article comprising any of the cured compositions. The curable composition is useful for fabricating a wide range of articles. Articles that may be fabricated from the composition include, for example, acid bath containers, neutralization tanks, electrorefining tanks, water softener tanks, fuel tanks, filament-wound tanks, filament-wound tank linings, electrolytic cells, exhaust stacks, scrubbers, automotive exterior panels, automotive floor pans, automotive air scoops, truck bed liners, drive shafts, drive shaft couplings, tractor parts, transverse leaf springs, crankcase heaters, heat shields, railroad tank cars, hopper car covers, boat hulls, submarine hulls, boat decks, marine terminal fenders, aircraft components, propeller blades, missile components, rocket motor cases, wing sections, sucker rods, fuselage sections, wing skins, wing flairings, engine narcelles, cargo doors, aircraft stretch block and hammer forms, bridge beams, bridge deckings, stair cases, railings, walkways, pipes, ducts, fan housings, tiles, building panels, scrubbing towers, flooring, expansion joints for bridges, injectable mortars for patch and repair of cracks in structural concrete, grouting for tile, machinery rails, metal dowels, bolts, posts, electrical encapsulants, electrical panels, printed circuit boards, electrical components, wire windings, seals for electromechanical devices, battery cases, resistors, fuses, thermal cut-off devices, coatings for printed wiring boards, capacitors, transformers, electrically conductive components for antistatic applications, tennis racquets, golf club shafts, fishing rods, skis, ski poles, bicycle parts, swimming pools, swimming pool slides, hot tubs, saunas, mixers, business machine housings, trays, dishwasher parts, refrigerator parts, furniture, garage doors, gratings, protective body gear, luggage, optical waveguides, radomes, satellite dishes, signs, solar energy panels, telephone switchgear housings, transformer covers, insulation for rotating machines, commutators, core insulation, dry toner resins, bonding jigs, inspection fixtures, industrial metal forming dies, vacuum molding tools, and the like. The composition is particularly useful a fiber-reinforced molding compound to produce the above articles.

The composition exhibits highly desirable properties. In one embodiment, composition after molding may exhibit a Dynatup total energy of at least about 9 Joules (J), preferably at least about 10 J, more preferably at least about 11 J, even more preferably at least about 12 J, measured at 25° C.

according to ASTM D3763. In another embodiment, the composition after molding exhibits a flexural strength greater than 10,000 pounds per square inch (psi), preferably greater than 11,000 psi, more preferably greater than 12,000 psi, measured at 25° C. according to ASTM D790. In another embodiment, the composition after molding exhibits a Dynatup total energy greater than 10 Joules measured at 25° C. according to ASTM D3763, and a flexural strength greater than 10,000 pounds per square inch measured at 25° C. according to ASTM D790. In another embodiment, the composition after molding exhibits a dielectric breakdown voltage of at least about 140 kilovolts, preferably at least about 150, kilovolts, measured according to the procedure described in the working examples below.

Another embodiment is a method of preparing a capped poly(arylene ether) resin, comprising: reacting a capping agent with a blend of a first poly(arylene ether) resin and a second poly(arylene ether) resin, wherein the first poly(arylene ether) resin and the second poly(arylene ether) resin have intrinsic viscosities differing by at least 0.1 deciliters per gram, measured at 25° C. in chloroform. Preferred capping agents include, for example, acetic anhydride, methacrylic anhydride, acrylic anhydride, salicylic anhydride, succinic anhydride, glutaric anhydride, propionic anhydride, isobutyric anhydride, maleic anhydride, adipic anhydride, phthalic anhydride, and the like, and combinations thereof. Another embodiment is a capped poly(arylene ether) resin prepared according to the above method.

The invention is further illustrated by the following non-limiting examples.

PREPARATIVE EXAMPLE 1

A 50-gallon reactor was charged with 38.15 kilograms (kg) of styrene monomer. The solution was heated to 60° C. and 7.6 kg of poly(2,6-dimethyl-1,4-phenylene ether) having an intrinsic viscosity of 0.12 dL/g and 17.2 kg of poly(2,6-dimethyl-1,4-phenylene ether) having an intrinsic viscosity of 0.30 dL/g were dissolved. After dissolution was complete, 209 grams of dimethylaminopyridine and 1.772 kg of methacrylic anhydride were added. The reaction was heated at 90° C. for 4 hours. The reaction mixture was cooled down to approximately 50° C. then treated with 162.5 g of t-butyl catechol and gravity drained from the reactor into polyethylene/Nylon barrier bags inserted in 5-gallon polypropylene containers.

EXAMPLE 1, COMPARATIVE EXAMPLES 1-3

Four compositions were prepared and tested according to the following procedure. The methacrylate-capped polyphenylene ether and styrene were combined and heated to about 60-80° C. After the mixture became fluid, it was stirred until it appeared uniform. The acryloyl compound and the polybutadiene-graft-maleic anhydride were then added sequentially with stirring. The resulting mixture was then combined with aluminum trihydrate, calcium stearate, and polyolefin powder and vigorously agitated for about three minutes. Then, magnesium oxide and t-butylperoxybenzoate were added, and the mixture was again agitated for about three minutes. Finally, the glass fibers were added and mixed to achieve uniform fiber distribution.

Polybutadiene-graft-maleic anhydride (PB-g-MA) was obtained as RICON® 131MA5 from Sartomer. A low density polyethylene powder having a melt index of 23 g/min, an average particle size of 20 micrometers, and a bulk density of 0.9245 g/mL was obtained from Equistar as MICROTHENE® FN 510.

Compositions and properties are summarized in Table 1. All component amounts are given in weight percent based on the total weight of the composition. Comparative Example 1, with methacrylate-capped poly(arylene ether) having an intrinsic viscosity of 0.12 dL/g, was very easy to prepare, due to its low viscosity. In contrast, Comparative Example 2, using a methacrylate-capped poly(arylene ether) having an intrinsic viscosity of 0.30 dL/g, was very difficult to process due to high viscosity. Comparative Example 3, using a blend of separately isolated capped poly(arylene ether) resins having intrinsic viscosities of 0.12 and 0.30 dL/g, and Example 1, using the capped poly(arylene ether) prepared in Preparative Example 1, were very easy to process.

Samples for physical testing were molded at 320° F. and 50 ton pressure. Tensile strength, expressed in pounds per square inch (psi), was measured according to ASTM D638. Flexural strength, expressed in psi, was measured according to ASTM D790. Dynatup impact maximum load (expressed in Newtons (N)), energy to maximum load (expressed in Joules (J)), and total energy (expressed in J) were measured according to ASTM D3763. The data show that the highest values of tensile strength, flexural strength, and impact strength are exhibited by the Example 1 composition using the capped poly(arylene ether) prepared by capping a mixture of two poly(arylene ether) resins having different intrinsic viscosities. This result is particularly unexpected given that these property values are significantly greater than those for Comparative Example 3, utilizing separately prepared and isolated capped poly(arylene ether) resins having different intrinsic viscosities.

TABLE 1

|  | C. Ex. 1 | C. Ex. 2 | C. Ex. 3 | Ex. 1 |
|---|---|---|---|---|
| Composition |  |  |  |  |
| MAA-PPE, IV = 0.12 (pbw) | 0.00 | 7.92 | 2.41 | 0.00 |
| MAA-PPE, IV = 0.30 (pbw) | 5.36 | 0.00 | 5.12 | 0.00 |
| MAA-PPE, prepared from PPEs with IV = 0.12 and 0.30 (pbw) | 0.00 | 0.00 | 0.00 | 7.47 |
| Styrene (pbw) | 14.89 | 13.20 | 14.48 | 14.50 |
| TMPTMA (pbw) | 8.22 | 7.35 | 6.46 | 6.50 |
| PB-g-MA (pbw) | 2.74 | 2.74 | 2.74 | 2.19 |
| Magnesium oxide (pbw) | 0.55 | 0.55 | 0.55 | 0.55 |
| t-Butylperoxybenzoate (pbw) | 0.73 | 0.73 | 0.73 | 0.73 |
| Polyethylene powder (pbw) | 3.65 | 3.65 | 3.65 | 3.65 |
| Calcium Stearate (pbw) | 0.91 | 0.91 | 0.91 | 0.91 |
| Aluminum Trihydrate (pbw) | 38.50 | 38.50 | 38.50 | 38.50 |
| Glass Fibers (pbw) | 25.00 | 25.00 | 25.00 | 25.00 |
| Properties |  |  |  |  |
| Tensile Strength (psi) | 5144 | 4700 | 5716 | 5846 |
| Flexural Strength (psi) | 9851 | 12134 | 13069 | 13671 |
| Dynatup Impact, maximum load (N) | 1155 | 1058 | 1108 | 1513 |
| Dynatup Impact, energy to maximum load (J) | 4.2 | 3.4 | 4.2 | 6.5 |
| Dynatup Impact, total energy (J) | 8.7 | 7.2 | 8.5 | 12.2 |

EXAMPLES 2 AND 3, COMPARATIVE EXAMPLE 4

A methacrylate-capped poly(2,6-dimethyl-1,4-phenylene ether) having an intrinsic viscosity of about 0.15 deciliters per gram in chloroform at 25° C. was prepared according to the method of Preparative Example 1, above. It was prepared from poly(2,6-dimethyl-1,4-phenylene ether) resins having intrinsic viscosities of 0.12 and 0.30 dL/g. Neopentyl glycol dimethacrylate (also known as neopentylene glycol dimethacrylate) was obtained from Sartomer as SR-248. Dipropylene glycol diacrylate was obtained from Sartomer as SR-508. Maleinized polybutadiene was obtained from Sartomer as RICON® 131. Glass fibers were obtained from Owens Corning as OCF101C. Compositions were prepared and molded according to the procedure of Example 1.

Dielectric breakdown voltage was measured on samples having a thickness of one-eighth inch. The dielectric breakdown voltage was performed using a pass/fail test at pre-set voltage levels. The waveform approximates the 1.2/50 impulse waveform and was performed using a negative going wave. The samples were tested under oil (DK7) using a 2 inch brass ground electrode and a 1 inch stainless steel high voltage electrode. Both electrodes were Rogowski profiled with broken edges to avoid high electrical fields. The gap setting of the spheres on the generator was set to provide the given voltage at that test level. The voltage levels were successively increased in steps until the sample failed. The starting voltage was set at 80 kV with steps of 10 kV until 130 kV at which steps were reduced to 5 kV. The general test procedure is summarized in the following steps:

1) The generator is tested under open circuit to confirm the voltage level. Generally two shots can be obtained from a particular gap configuration.
2) The sample is inserted between the electrodes under oil.
3) The sample is stressed with the impulse.
4) The withstand voltage of the sample is recorded or if the sample failed, it is recorded as a flashover or failure.
5) If the sample passes, it is again stressed with the higher voltage of this gap setting.
6) Step 5 continues until the sample fails, or the top voltage of that gap setting is reached.
7) The first sample is removed and set aside and the next sample is placed between the electrodes.
8) Steps 3-6 are repeated until all samples are tested at this gap setting (voltage level).
9) The gaps are reset to move to higher voltage levels.
10) Steps 1-9 are repeated until all samples have failed.
11) Reported values represent the last withstand voltage that the sample exhibited. In other words, that is the last level at which the material passed—holding off the voltage.

Compositions and properties are summarized in Table 2. The results show that the example compositions exhibit dielectric breakdown voltages higher than that of the commercial unsaturated polyester resin. The high dielectric breakdown voltage of the composition makes it suitable for electrical insulation.

TABLE 2

|  | Ex. 2 | Ex. 3 | C. Ex. 4 |
|---|---|---|---|
| Composition |  |  |  |
| Commercial UPR (pbw) | 0 | 0 | 100.00 |
| MAA-PPE (pbw) | 9.47 | 9.3 | — |
| Styrene (pbw) | 9.79 | 18.1 | — |
| Dipropylene glycol diacrylate (pbw) | 5.132 | 0 | — |
| Neopenyl glycol dimethacrylate (pbw) | 0 | 4.80 | — |
| PB-g-MA (pbw) | 1.429 | 1.60 | — |
| Magnesium oxide amount (pbw) | 0.086 | 0.40 | — |
| t-Butylperoxy benzoate (pbw) | 0.513 | 0.80 | — |
| Maleinized polybutadiene (pbw) | 2.566 | 0 | — |
| Polyethylene powder (pbw) | 0 | 4.00 | — |
| Calcium stearate (pbw) | 1.026 | 1.00 | — |
| Aluminum trihydrate (pbw) | 50.00 | 35.00 | — |
| glass fiber (pbw) | 20.00 | 25.00 | — |
| Properties |  |  |  |
| dielectric breakdown voltage (kV) | 148.0 | 159.0 | 129.0 |

EXAMPLES 4-15

Several compositions were prepared and molded according to the procedure of Example 1. The compositions utilized a methacrylate-capped poly(2,6-dimethyl-1,4-phenylene ether). It was prepared by capping a mixture of polyphenylene ether resins having intrinsic viscosities of 0.12 and 0.30 dL/g. Di-t-butylperoxytrimethylcyclohexane (isophorone peroxide) was obtained from Akzo Nobel as TRIGONOX® 29B75. A polybutadiene-block-polyisoprene copolymer (PB-b-PI) having a weight average molecular weight of 30,000 amu was obtained from Aldrich. A flow-enhanced polypropylene powder having powder having a melt index of 35 g/min, an average particle size of 20 micrometers, and a bulk density of 0.909 g/mL was obtained from Equistar as MICROTHENE® FP 809. Test samples were compression molded at 320° F. with full pressure on 50-ton presser. Dynatup energy to maximum load and total energy, both expressed in Joules (J), were determined according to ASTM D3763. Unnotched Izod strength, expressed in Joules/meter (J/m), was determined according to ASTM D256. Break strength, expressed in pounds per square inch (psi), was determined according to D638. Tangent modulus, expressed in $10^6$ psi, was determined according to D638. Tensile elongation at maximum load, expressed in percent (%), was determined according to ASTM D638. Flexural modulus, expressed in megapascals (MPa), at 25 and 150° C. was determined according to ASTM D790. Flexural strength, expressed in psi, was also determined according to ASTM D790.

Compositions and properties are summarized in Table 3. The results show that cured compositions comprising a capped poly(arylene ether) prepared by capping a mixture of poly(arylene ether) resins having different intrinsic viscosities exhibit high flexural modulus at elevated temperature, high impact strength, high ductility, and a tunable property balance.

TABLE 3

|  | Ex. 4 | Ex. 5 | Ex. 6 |
|---|---|---|---|
| Composition |  |  |  |
| MAA-PPE, IV = 0.25 (pbw) | 6.13 | 5.79 | 5.21 |
| Styrene (pbw) | 11.90 | 11.23 | 10.10 |

TABLE 3-continued

| | | | |
|---|---|---|---|
| Neopenyl glycol dimethacrylate (pbw) | 9.50 | 4.90 | 8.00 |
| PB-g-MA (pbw) | 1.60 | 1.20 | 1.20 |
| Magnesium oxide amount (pbw) | 0.40 | 0.30 | 0.30 |
| Isophorone peroxide (pbw) | 0.80 | 0.60 | 0.60 |
| PB-b-PI (pbw) | 1.60 | 1.30 | 0.60 |
| Polypropylene powder (pbw) | 6.20 | 3.00 | 2.30 |
| Calcium stearate (pbw) | 1.00 | 0.70 | 0.70 |
| Aluminum trihydrate (pbw) | 35.00 | 40.00 | 35.00 |
| Glass fiber (pbw) | 25.00 | 30.00 | 35.00 |
| Carbon black (pbw) | 1.00 | 1.00 | 1.00 |
| Properties | | | |
| Dynatup energy to max. load (J) | 5.576 ± 1.782 | 7.461 ± 0.555 | 7.601 ± 1.779 |
| Dynatup total energy (J) | 13.998 ± 2.183 | 16.236 ± 1.618 | 18.765 ± 2.920 |
| Unnotched Izod (J/m) | 463.5 ± 116.9 | 558.6 ± 233.43 | 331.1 ± 131.58 |
| Cure time (sec) | 61 | 55 | 52 |
| Linear shrinkage (in/in) | 0.0027 | 0.0017 | 0.0017 |
| Break strength (psi) | 5981 ± 828 | 5902 ± 1203 | 4671 ± 1039 |
| Tangent tensile modulus ($10^6$ psi) | 1.304 ± 0.169 | 1.840 ± 0.106 | 1.794 ± 0.065 |
| Tensile elongation at max. load (%) | 0.734 ± 0.162 | 0.540 ± 0.320 | 0.242 ± 0.077 |
| Initial modulus (MPa) | 12535 | 16422 | 15107 |
| Flexural modulus at 150° C. (MPa) | 6774 | 9501 | 9209 |
| Glass transition temperature (° C.) | 200.18 | 192.13 | 199.19 |
| Flexural strength (psi) | 15068 ± 2477 | 15508 ± 1818 | 12405 ± 2299 |
| Tangent flexural modulus ($10^6$ psi) | 1.084 ± 0.044 | 1.520 ± 0.070 | 1.583 ± 0.173 |
| | Ex. 7 | Ex. 8 | Ex. 9 |
| Composition | | | |
| MAA-PPE, IV = 0.25 (pbw) | 7.0 | 6.29 | 5.79 |
| Styrene (pbw) | 13.58 | 12.20 | 11.23 |
| Neopenyl glycol dimethacrylate (pbw) | 10.80 | 4.90 | 4.90 |
| PB-g-MA (pbw) | 1.60 | 1.20 | 1.20 |
| Magnesium oxide amount (pbw) | 0.40 | 0.30 | 0.30 |
| Isophorone peroxide (pbw) | 0.80 | 0.60 | 0.60 |
| PB-b-PI (pbw) | 1.60 | 1.20 | 1.30 |
| Polypropylene powder (pbw) | 2.30 | 1.70 | 3.00 |
| Calcium stearate (pbw) | 1.00 | 0.70 | 0.70 |
| Aluminum trihydrate (pbw) | 35.00 | 35.00 | 40.00 |
| Glass fiber (pbw) | 25.00 | 35.00 | 30.00 |
| Carbon black (pbw) | 1.00 | 1.00 | 1.00 |
| Properties | | | |
| Dynatup energy to max. load (J) | 6.455 ± 1.037 | 8.044 ± 1.261 | 4.892 ± 1.154 |
| Dynatup total energy (J) | 16.614 ± 2.963 | 19.996 ± 2.246 | 14.264 ± 2.954 |
| Unnotched Izod (J/m) | 407.88 ± 196.76 | 470.33 ± 194.20 | 415.35 ± 226.81 |
| Cure time (sec) | 60 | 58 | 59 |
| Linear shrinkage (in/in) | 0.0028 | 0.0017 | 0.0015 |
| Break strength (psi) | 4942 ± 1341 | 4744 ± 500 | 5413 ± 1066 |
| Tangent tensile modulus ($10^6$ psi) | 1.473 ± 0.297 | 1.914 ± 0.370 | 1.880 ± 0.240 |
| Tensile elongation at max. load (%) | 0.622 ± 0.322 | 0.510 ± 0.130 | 0.330 ± 0.080 |
| Initial modulus (MPa) | 12990 | 16369 | 14693 |
| Flexural modulus at 150° C. (MPa) | 8196 | 9414 | 8036 |
| Glass transition temperature (° C.) | 199.8 | 183.63 | 190.41 |
| Flexural strength (psi) | 16068 ± 2616 | 14197 ± 3255 | 14546 ± 2033 |
| Tangent flexural modulus ($10^6$ psi) | 1.101 ± 0.089 | 1.429 ± 0.054 | 1.37 ± 0.030 |
| | Ex. 10 | Ex. 11 | Ex. 12 |
| Composition | | | |
| MAA-PPE, IV = 0.25 (pbw) | 4.56 | 5.51 | 5.79 |
| Styrene (pbw) | 8.85 | 10.69 | 11.23 |
| Neopenyl glycol dimethacrylate (pbw) | 7.00 | 4.30 | 4.90 |
| PB-g-MA (pbw) | 1.20 | 1.20 | 1.20 |
| Magnesium oxide amount (pbw) | 0.30 | 0.30 | 0.30 |
| Isophorone peroxide (pbw) | 0.60 | 0.60 | 0.60 |
| PB-b-PI (pbw) | 2.30 | 1.20 | 1.30 |
| Polypropylene powder (pbw) | 3.50 | 4.60 | 3.00 |
| Calcium stearate (pbw) | 0.70 | 0.70 | 0.70 |
| Aluminum trihydrate (pbw) | 35.00 | 35.00 | 40.00 |
| Glass fiber (pbw) | 35.00 | 35.00 | 30.00 |
| Carbon black (pbw) | 1.00 | 1.00 | 1.00 |

TABLE 3-continued

| Properties | | | |
|---|---|---|---|
| Dynatup energy to max. load (J) | 6.614 ± 0.799 | 6.525 ± 1.339 | 6.142 ± 3.335 |
| Dynatup total energy (J) | 17.159 ± 2.788 | 16.165 ± 2.863 | 13.536 ± 4.893 |
| Unnotched Izod (J/m) | 494.99 ± 124.54 | 519.49 ± 100.57 | 384.71 ± 122.83 |
| Cure time (sec) | 52 | 61 | 59 |
| Linear shrinkage (in/in) | 0.0012 | 0.0016 | 0.0016 |
| Break strength (psi) | 5584 ± 1230 | 6818 ± 1169 | 5678 ± 897 |
| Tangent tensile modulus ($10^6$ psi) | 2.198 ± 0.287 | 2.265 ± 0.483 | 2.000 ± 0.120 |
| Tensile elongation at max. load (%) | 0.386 ± 0.141 | 0.673 ± 0.216 | 0.579 ± 0.225 |
| Initial modulus (MPa) | 16239 | 13890 | 17170 |
| Flexural modulus at 150° C. (MPa) | 10431 | 6816 | 9998 |
| Glass transition temperature (° C.) | 204.55 | 188.84 | 189.11 |
| Flexural strength (psi) | 14259 ± 2829 | 15885 ± 777 | 15273 ± 3026 |
| Tangent flexural modulus ($10^6$ psi) | 1.423 ± 0.066 | 1.552 ± 0.066 | 1.430 ± 0.090 |
| | Ex. 13 | Ex. 14 | Ex. 15 |
| Composition | | | |
| MAA-PPE, IV = 0.25 (pbw) | 8.64 | 7.41 | 5.79 |
| Styrene (pbw) | 16.41 | 14.37 | 11.23 |
| Neopenyl glycol dimethacrylate (pbw) | 6.50 | 5.70 | 4.90 |
| PB-g-MA (pbw) | 1.60 | 1.60 | 1.20 |
| Magnesium oxide amount (pbw) | 0.40 | 0.40 | 0.30 |
| Isophorone peroxide (pbw) | 0.80 | 0.80 | 0.60 |
| PB-b-PI (pbw) | 0.80 | 3.10 | 1.30 |
| Polypropylene powder (pbw) | 3.10 | 4.70 | 3.00 |
| Calcium stearate (pbw) | 1.00 | 1.00 | 0.70 |
| Aluminum trihydrate (pbw) | 35.00 | 35.00 | 40.00 |
| Glass fiber (pbw) | 25.00 | 25.00 | 30.00 |
| Carbon black (pbw) | 1.00 | 1.00 | 1.00 |
| Properties | | | |
| Dynatup energy to max. load (J) | 6.660 ± 1.625 | 8.121 ± 0.977 | 10.418 ± 3.305 |
| Dynatup total energy (J) | 14.384 ± 2.462 | 16.975 ± 2.083 | 12.355 ± 4.448 |
| Unnotched Izod (J/m) | 235.67 ± 133.88 | 359.73 ± 167.99 | 562.30 ± 268.39 |
| Cure time (sec) | 73 | 69 | 60 |
| Linear shrinkage (in/in) | 0.0022 | 0.0019 | 0.0017 |
| Break strength (psi) | 6778 ± 1044 | 7925 ± 1614 | 5450 ± 779 |
| Tangent tensile modulus ($10^6$ psi) | 1.475 ± 0.210 | 1.493 ± 0.210 | 1.84 ± 0.150 |
| Tensile elongation at max. load (%) | 0.530 ± 0.025 | 0.769 ± 0.085 | 0.432 ± 0.126 |
| Initial modulus (MPa) | 13398 | 10862 | 14832 |
| Flexural modulus at 150° C. (MPa) | 7395 | 5725 | 8378 |
| Glass transition temperature (° C.) | 182.30 | 185.35 | 188.38 |
| Flexural strength (psi) | 11113 ± 1122 | 13883 ± 3782 | 16039 ± 1283 |
| Tangent flexural modulus ($10^6$ psi) | 1.08 ± 0.08 | 0.95 ± 0.15 | 1.41 ± 0.09 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A method of preparing a capped poly(arylene ether) resin, comprising:
reacting a capping agent with a blend of a first poly(arylene ether) resin and a second poly(arylene ether) resin; wherein the first poly(arylene ether) resin and the second poly(arylene ether) resin have intrinsic viscosities differing by at least 0.1 deciliters per gram, measured at 25° C. in chloroform; and wherein the capping agent is selected from the group consisting of acetic anhydride, propionic anhydride, isobutyric anhydride, acrylic anhydride, methacrylic anhydride, glycidyl acrylate, glycidyl methacrylate, acetyl chloride, benzoyl chloride, diphenyl carbonates, di(4-nitrophenyl)carbonate, acryloyl esters, methacryloyl esters, acetyl esters, phenylisocyanate, 3-isopropenyl-α,α-dimethylphenylisocyanate, cyanatobenzene, 2,2-bis(4-cyanatophenyl)propane, 3-(α-chloromethyl)styrene, 4-(α-chloromethyl)styrene, allyl bromide, and mixtures thereof.

2. The method of claim 1, wherein the capped poly(arylene ether) resin has an intrinsic viscosity of about 0.15 to about 0.45 deciliters per gram.

3. The method of claim 1, wherein the first poly(arylene ether) resin has an intrinsic viscosity of about 0.05 to less than 0.20 deciliters per gram.

4. The method of claim 1, wherein the second poly(arylene ether) resin has an intrinsic viscosity of at least 0.20 to about 0.60 deciliters per gram.

5. The method of claim 1, wherein the first and second poly(arylene ether) resins each consisting essentially of the polymerization product of at least one monohydric phenol having the structure

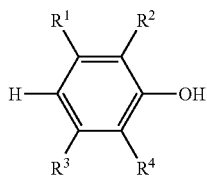

wherein $R^1$ and $R^3$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_2$-$C_{12}$ halohydrocarbyloxy wherein at least two carbon atoms separate the halogen and oxygen atoms; $R^2$ and $R^4$ are each independently halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_2$-$C_{12}$ halohydrocarbyloxy wherein at least two carbon atoms separate the halogen and oxygen atoms.

6. The method of claim 1, wherein the capped poly(arylene ether) comprises at least one capping group having the structure

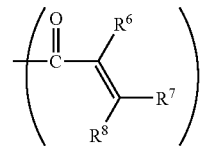

wherein $R^6$ is hydrogen or methyl, and $R^7$ and $R^8$ are hydrogen.

7. The method of claim 1, wherein the capping agent is selected from acetic anhydride, methacrylic anhydride, acrylic anhydride, propionic anhydride, isobutyric anhydride, and combinations thereof.

* * * * *